(12) United States Patent
Goradia et al.

(10) Patent No.: US 12,309,154 B2
(45) Date of Patent: May 20, 2025

(54) METHODS AND SYSTEMS FOR DISPLAYING A CLOUD ACCESS SECURITY BROKER (CASB) CONFIGURATION WINDOW

(71) Applicant: Versa Networks, Inc., Santa Clara, CA (US)

(72) Inventors: Harnish Narendra Goradia, Milpitas, CA (US); Siu Yeung Byron Sin, Bracknell (GB)

(73) Assignee: Versa Networks, Inc., San Jose, CA (US)

( * ) Notice: Subject to any disclaimer, the term of this patent is extended or adjusted under 35 U.S.C. 154(b) by 391 days.

(21) Appl. No.: 18/072,273

(22) Filed: Nov. 30, 2022

(65) Prior Publication Data
US 2024/0179149 A1 May 30, 2024

(51) Int. Cl.
*H04L 9/40* (2022.01)
(52) U.S. Cl.
CPC .................. *H04L 63/101* (2013.01)
(58) Field of Classification Search
CPC .................................... H04L 63/101
See application file for complete search history.

(56) References Cited

U.S. PATENT DOCUMENTS

| | | | | |
|---|---|---|---|---|
| 2020/0242269 | A1* | 7/2020 | Narayanaswamy | G06F 21/55 |
| 2022/0060557 | A1* | 2/2022 | Bathla | H04L 63/20 |
| 2022/0360562 | A1* | 11/2022 | Hanes | H04L 63/0263 |
| 2023/0344842 | A1* | 10/2023 | Akhtar | H04L 63/1425 |
| 2024/0028499 | A1* | 1/2024 | Amador | G06F 11/3684 |

* cited by examiner

*Primary Examiner* — Abiy Getachew
(74) *Attorney, Agent, or Firm* — LOZA & LOZA, LLP

(57) ABSTRACT

A non-transitory computer readable medium, a system, and a method for displaying a cloud access security broker (CASB) configuration window are disclosed. In an embodiment, the non-transitory computer readable medium includes instructions to be executed in a computer system, where the instructions when executed in the computer system perform a method comprising displaying a CASB configuration window, and displaying a CASB profile control menu within the CASB configuration window, where the CASB profile control menu includes a plurality of spatially grouped sets that include an application access controller, an application identifier, and selectable CASB activity action icons that indicate to a user whether a corresponding CASB activity action is included in an application profile of a CASB profile.

18 Claims, 13 Drawing Sheets

METHODS AND SYSTEMS FOR DISPLAYING A CLOUD ACCESS SECURITY BROKER (CASB) CONFIGURATION WINDOW

BACKGROUND

When accessing applications, uploading data, downloading data, and/or sharing data, users of client devices, e.g., personal computers (PCs), may be subject to various restrictions and/or limitations. Cloud access security broker (CASB) policies may be configured by a user and implemented at a client device to enforce restrictions which may control user access, protect information, limit exposure to malware infections, and the like. However, the user may not be able to easily configure a CASB profile and may not even be aware of actions protected by the CASB profile.

SUMMARY

A non-transitory computer readable medium, a system, and a method for displaying a cloud access security broker (CASB) configuration window are disclosed. In an embodiment, the non-transitory computer readable medium includes instructions to be executed in a computer system, where the instructions when executed in the computer system perform a method comprising displaying a CASB configuration window, and displaying a CASB profile control menu within the CASB configuration window, where the CASB profile control menu includes a plurality of spatially grouped sets that include an application access controller, an application identifier, and selectable CASB activity action icons that indicate to a user whether a corresponding CASB activity action is included in an application profile of a CASB profile.

In an embodiment, the spatially grouped sets that include the application access controller, the application identifier, and the selectable CASB activity action icons are displayed in a series of rows within the CASB profile control menu.

In an embodiment, the spatially grouped sets that include the application access controller, the application identifier, and the selectable CASB activity action icons correspond to application profiles.

In an embodiment, the application identifier and the selectable CASB activity action icons of the corresponding application profiles are displayed linearly within application profile panels.

In an embodiment, the application identifier and the selectable CASB activity action icons of the corresponding application profiles are displayed linearly within application profile panels, and the application access controllers of the corresponding application profiles are adjacent to the application profile panels.

In an embodiment, the application access controller is displayed by a togglable button that controls access to an application.

In an embodiment, when one of the application access controllers is set to an "allow" state, the selectable CASB activity action icons that correspond to a same application profile can be selected.

In an embodiment, when one of the application access controllers is set to a "blocked" state, the selectable CASB activity action icons that correspond to a same application profile cannot be selected.

In an embodiment, application profiles corresponding to the application access controllers that are set to an "allow" state are allowed in the CASB profile.

In an embodiment, application profiles corresponding to the application access controllers that are set to a "blocked" state are blocked in the CASB profile.

In an embodiment, the selectable CASB activity action icons that are selected are included in the application profile of the CASB profile.

In an embodiment, the selectable CASB activity action icons that are unselected are not included in the application profile of the CASB profile.

In an embodiment, the selectable CASB activity action icons include a symbol, a label, and a selection indicator.

In an embodiment, the symbol is at least one of a magnifying glass symbol, a page with a pencil symbol, a circle with a cross symbol, a three connected circles symbol, an arrow symbol, a page with an arrow symbol, and a trash can symbol, the label indicates a CASB activity that is at least one of search, edit, create, share, login, download attachment, upload file, and delete, and the selection indicator is at least one of a green selected color and a gray unselected color.

In an embodiment, the selectable CASB activity action icons that are selected are indicated by the green selected color.

In an embodiment, the selectable CASB activity action icons that are unselected are indicated by the gray unselected color.

In an embodiment, the spatially grouped sets that include the application access controller, the application identifier, and the selectable CASB activity action icons correspond to an application profile, where the selectable CASB activity action icons are an application specific set of icons for the corresponding application profile, and the selectable CASB activity action icons include a symbol, a label, and a selection indicator, where the symbol and the label indicate the corresponding CASB activity action and the selection indicator indicates whether the corresponding CASB activity action is included in the application profile.

In an embodiment, the spatially grouped sets that include the application access controller, the application identifier, and the selectable CASB activity action icons correspond to an application profile and are displayed linearly within the CASB profile control menu, and the selectable CASB activity action icons include a symbol, a label, and a selection indicator, where the symbol and the label indicate the corresponding CASB activity action and the selection indicator indicates whether the corresponding CASB activity action is included in the application profile.

A system for displaying a CASB configuration window is also disclosed. In an embodiment, the system includes at least one processor configured to execute computer readable instructions stored in at least memory, where the computer readable instructions when executed by the at least one processor perform a method comprising displaying a CASB configuration window, and displaying a CASB profile control menu within the CASB configuration window, where the CASB profile control menu includes a plurality of spatially grouped sets that include an application access controller, an application identifier, and selectable CASB activity action icons that indicate to a user whether a corresponding CASB activity action is included in an application profile of a CASB profile.

A method for displaying a CASB configuration window is also disclosed. In an embodiment, the method includes displaying a CASB configuration window, and displaying a CASB profile control menu within the CASB configuration window, where the CASB profile control menu includes a plurality of spatially grouped sets that include an application access controller, an application identifier, and selectable CASB activity action icons that indicate to a user whether a corresponding CASB activity action is included in an application profile of a CASB profile.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
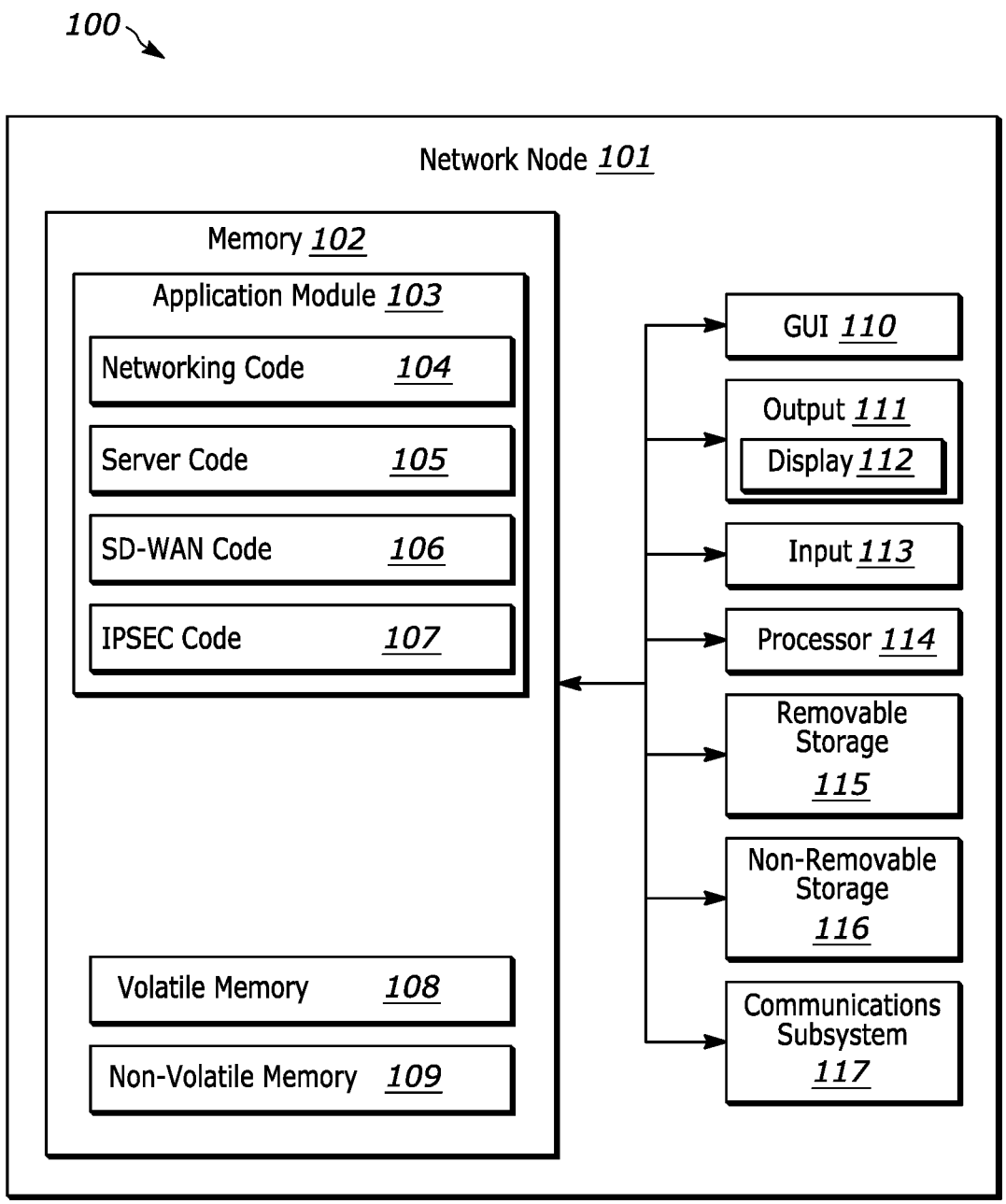
FIG. 1 is a high-level block diagram of a network node.

FIG. 1 is a high-level block diagram 100 of a network node 101. The network node 101 may be in the form of a computer configured to interface with controllers, peripheral devices, and other elements disclosed herein. The network node 101 may include one or more processors 114, memory 102, removable storage 115, and non-removable storage 116. The memory 102 may include volatile memory 108 and/or non-volatile memory 109. The network node 101 may include or have access to a computing environment that includes a variety of transitory and non-transitory computer-readable media such as the volatile memory 108, the non-volatile memory 109, the removable storage 115 and the non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

The network node 101 may include, or have access to, a computing environment that includes an input device 113, an output device 111, and a communications subsystem 117. The network node 101 may operate in a networked environment using the communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, radio frequency identification (RFID) enabled device, a peer device, other common network node, or the like. The communication connection may include a local area network (LAN), a wide area network (WAN), Bluetooth connection, or other networks.

The output device 111 may be provided as a computer monitor, but may include any output device. The output device 111 and/or the input device 113 may include a data collection apparatus associated with the network node 101. In addition, the input device 113, which commonly includes a computer keyboard and/or pointing device such as a computer mouse, computer track pad, touch screen, or the like, allows a user to select and instruct the network node 101. A user interface can be provided using the output device 111 and the input device 113. The output device 111 may include a display 112 for displaying data and information for a user, or for interactively displaying a graphical user interface (GUI) 110. A GUI is typically responsive of user inputs entered through the input device 113 and typically displays images and data on the display 112.

As described herein, "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with the input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in the application module 103, can include or be representative of software routines, software subroutines, software objects, etc. described herein, are stored on a computer-readable medium and are executable by the processor device (also called a processing unit) 114 of the network node 101. The application module 103 can include computer code such as networking code 104, server code 105, software defined wide area network (SD-WAN) code 106, and Internet Protocol Security (IPSEC) code 107. A hard drive, CD-ROM, RAM, Flash Memory, and a Universal Serial Bus (USB) drive are just some examples of articles including a computer-readable medium.

Figure 2:
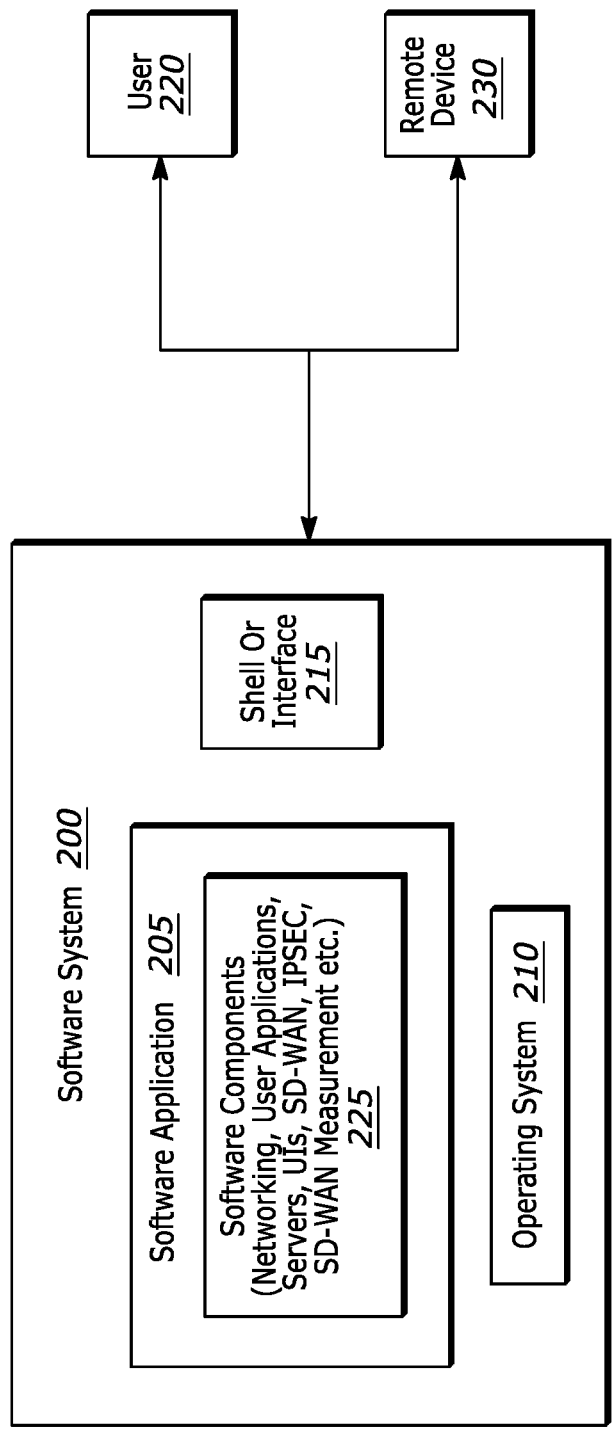
FIG. 2 is a high-level block diagram of a software system.

FIG. 2 is a high-level block diagram of a software system 200. FIG. 2 illustrates a software system 200, which may be employed for directing the operation of a data-processing systems such as the network node 101. Software applications may be stored in the memory 102, on the removable storage 115, and/or on the non-removable storage 116, and generally include and/or are associated with a kernel or operating system 210 and a shell or interface 215. One or more application programs may be "loaded" (i.e., transferred from the removable storage 115 or the non-removable storage 116 into the memory 102) for execution by the network node 101. A software application 205 can include software components 225 such as software modules, software subroutines, software objects, network code, user application code, server code, user interface (UI) code, SD-WAN code, IPSEC code, SD-WAN measurement code, etc. The software system 200 can have multiple software applications each containing software components. The network node 101 can receive user commands and data through the interface 215, which can include the input device 113, the output device 111, and the communications subsystem 117 accessible by a user 220 or a remote device 230. These inputs may then be acted upon by the network node 101 in accordance with instructions from the operating system 210 and/or the software application 205 and any software components 225 thereof.

Generally, the software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms "application" or "component" may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, the operating system 210 and the GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to the operating system 210 and the interface 215. The software application 205 can include, for example, the software components 225, which can include instructions for carrying out steps or logical operations such as those shown and described herein.

The description herein is presented with respect to embodiments that can be embodied in the context of, or require the use of, a data-processing system such as the network node 101, in conjunction with program code in the application module 103, in the memory 102, the software system 200, or the network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM, and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including a multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

In some embodiments, when a user of a client device (e.g., network node 101) is using cloud applications, uploading data to the cloud, downloading data from the cloud, sharing data from the cloud, etc. the application and/or the data may be subject to certain security features which may limit user access. In such an embodiment, a cloud access security broker (CASB) may be implemented to control the user access and/or improve network security.

As described herein, "CASB" may be defined as a cloud-based security function that controls access to cloud applications and data. CASB services allow organizations to implement security policies that may govern which users and/or devices have access to the cloud applications and/or information stored in a cloud-based server. As an example, CASB enables granular policy definitions that enable enterprises to control access at levels such as, for example, file, application, individual, device, and/or organization. In some embodiments, CASB may be implemented as an agent-based CASB, an agentless CASB, an inline CASB, an out-of-band CASB, a real-time CASB, or a near-real-time CASB.

As described herein, activity that is protected by CASB may be referred to as "CASB protected activity", and may be implemented via a Secure Access Service Edge (SASE) service or a stand-alone secure internet access service. Additionally, the CASB protected activity may be implemented at a client device (e.g., a computer, a smartphone, a tablet, etc.) and/or a server. The CASB protected activity may protect information stored, accessed, or shared from/by an enterprise cloud application when accessing cloud services. Examples of protection may include Data Loss Protection (DLP), malware detection of different types (e.g., antivirus (AV), Advanced Threat Protection (ATP), etc.), and other forms of filtering or protection of data.

In an embodiment, CASB protected activity involves certain limitations and/or restrictions that protect access to application and/or information stored in the cloud. As described herein, the limitations and/or the restrictions that a user is subject to during CASB protected activity may be referred to as "CASB activity actions". In an embodiment, one or more CASB activity actions are included in an application profile that may be configured as part of a CASB profile. As described herein, an "CASB profile" may be defined by an application profile where one or more CASB activity actions can be triggered by CASB protected activity. In some embodiments, the CASB activity actions of an application profile included in a CASB profile are a created configuration of a predefined CASB profile or a custom defined CASB profile for a cloud application or a Uniform Resource Locator (URL) for a cloud application. The CASB profile may be configured by a security operations administrator, or an information technology (IT) administrator of an enterprise via a CASB configuration window. The CASB configuration window may be displayed as part of an application or a browser for configuring a CASB profile.

It is important for the CASB configuration window to allow a user (e.g., security operations administrator or IT administrator of an enterprise) to easily configure a CASB profile so that the correct restrictions and/or limitations are included in the CASB profile. However, conventional CASB configuration windows may not provide a clear visual indication (to the user) that a certain CASB profile or CASB activity action(s) are included in a CASB profile. As such, the user may be unaware of whether or not the certain CASB profile or CASB activity action(s) will be protected during CASB protected activities. Consequently, a user may be more likely to have improper access and/or data sharing capabilities.

In accordance with an embodiment of the invention, a non-transitory computer readable medium that includes instructions to be executed in a computer system, where the instructions when executed in the computer system perform a method that includes displaying a CASB configuration window, and displaying a CASB profile control menu within the CASB configuration window, wherein the CASB profile control menu includes a plurality of spatially grouped sets that include an application access controller, an application identifier, and selectable CASB activity action icons that indicate to a user whether a corresponding CASB activity action is included in an application profile of a CASB profile.

By displaying the CASB profile control menu using the plurality of spatially grouped sets, the CASB configuration window may be navigated with minimal eye movement and minimal user input (e.g., cursor movement, mouse clicking, and/or keyboard clicking). In addition, the application access controller, the application identifier, and the selectable CASB activity action icons allow the CASB configuration window to provide a clear visual representation of the different application profiles and corresponding CASB activity actions that can be selected by the user (e.g., IT administrator of an enterprise). The CASB configuration window is organized in an easily understandable intuitive way that eases use for the user. As such, the CASB profile may be configured with greater ease and accuracy, causing a client device that implements the CASB profile to more likely be subject to the correct combination of restrictions and/or limitations as intended by the user, all of which can greatly improve the user experience.

While a CASB profile configured by a user (e.g., IT administrator of an enterprise) on a client device may be implemented during CASB protected activity on the user's client device, the CASB profile configured by the user may also be implemented at other user's client devices. In an embodiment, a user (e.g., IT administrator of an enterprise) configures a CASB profile for a different user. For example, an IT administrator of an enterprise can configure CASB profiles for employees of the enterprise, such that each employee or category of employee has a particular CASB profile in place. In some embodiments, the CASB profile configured by the user may be implemented at one or more other client devices included in an enterprise network, or that are connected to an enterprise cloud or an enterprise server. Thus, the user experience may be further enhanced as the user (e.g., IT administrator) can easily configure one or more CASB profiles for a variety of employees or employee categories.

An example of a client device that includes a display for displaying a CASB configuration window is described in further detail with reference to FIG. 3.

Figure 3:
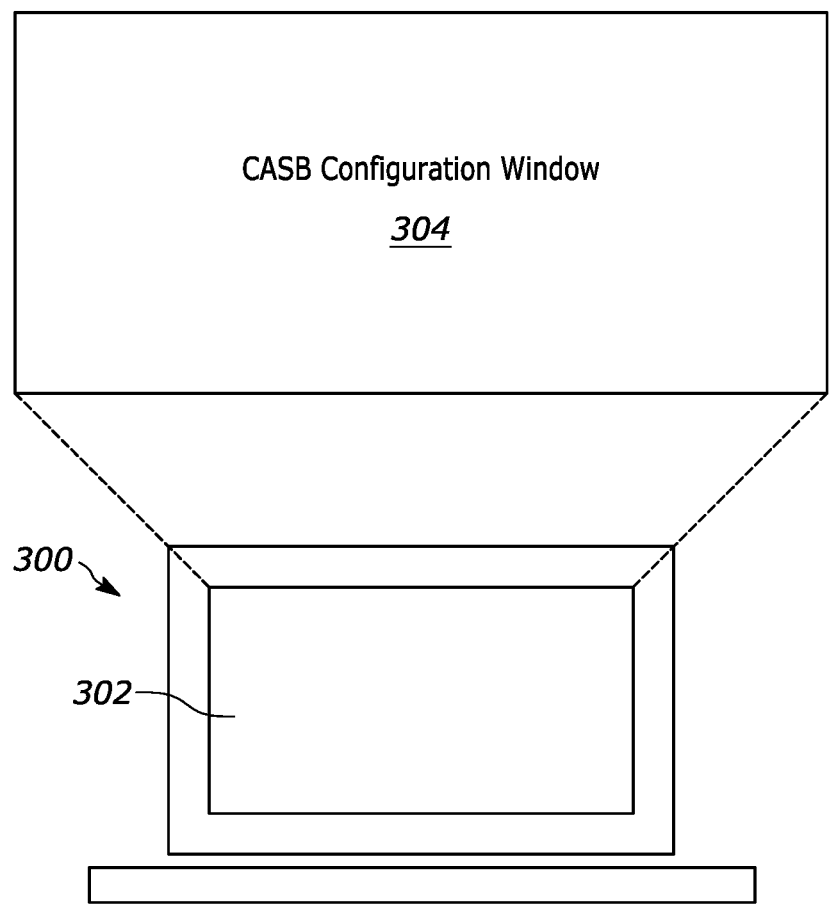
FIG. 3 depicts a device that includes a display for displaying a cloud access security broker (CASB) configuration window.

FIG. 3 depicts a client device 300 that includes a display 302 for displaying a CASB configuration window 304. The client device 300 may include the network node 101 (FIG. 1) and the software system 200 (FIG. 2), and may be, for example, a laptop, a mobile device, a desktop, or the like. In addition, the client device 300 includes a user interface (e.g., a keyboard and/or a mouse) for user input(s), and a display 302 for interactively displaying a GUI. The client device 300 may connect to a remote server, a remote cloud, a remote cloud-based container, or the like. The client device 300 may be connected to the server and internet (not shown) via a wireless connection (e.g., wireless LAN, wireless WAN, Bluetooth, etc.), a wired connection (e.g., ethernet), or a combination thereof.

The CASB configuration window 304 is displayed by the display 302 via a GUI. In some embodiments, the CASB configuration window 304 is displayed as part of an application or a browser for configuring a CASB profile. The CASB configuration window 304 may include a plurality of interactive elements (e.g., an application access controller, application access controllers, application identifier, and selectable CASB activity action icons) for configuring the CASB profile. As an example, a user may navigate the CASB configuration window 304 (e.g., using a mouse and/or a keyboard connected to the client device 300) to configure the CASB profile. Examples of the CASB configuration window 304 are described in further detail with reference to FIGS. 4-7.

Figure 4:
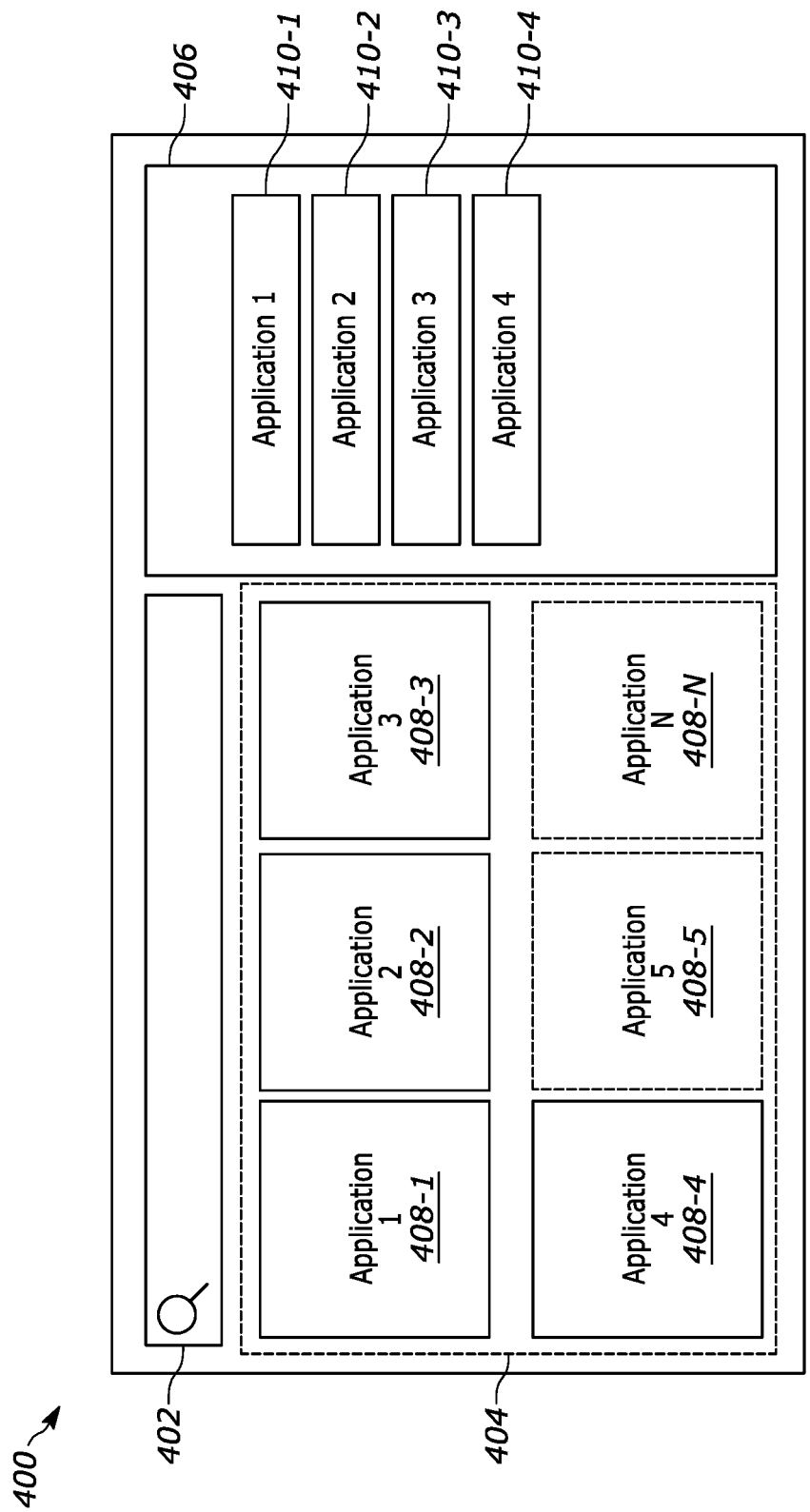
FIG. 4 depicts an example of a preceding CASB configuration window.

FIG. 4 depicts an example of a preceding CASB configuration window 400. The preceding CASB configuration window 400 includes an application search bar 402, an application panel 404, and a selected application panel 406. In some embodiments, the preceding CASB configuration window 400 represents the CASB configuration window 304, and is displayed via a GUI on the display 302 of the client device 300. As an example, the preceding CASB configuration window 400 is displayed as part of an application or a browser that is run (e.g., processed) by the client device. Various elements of the preceding CASB configuration window 400 may be controlled by a user to select applications to be configured as part of a CASB profile in a subsequent window.

The application search bar 402 may be used by a user to search for an application in the application panel 404. For example, the user may click on the application search bar 402, and then enter (e.g., type) a name/title of the application to be searched. In such an example, if the application is included in the application panel 404, then the application will appear in the application panel 404 and other applications that do not match the search will not appear.

The application panel 404 includes at least five application identifiers, implemented as application identifiers 408-1, 408-2, 408-3, 408-4, 408-5, and/or 408-N (N represents an integer greater than five). The application identifiers 408-1, 408-2, 408-3, 408-4, 408-5, and/or 408-N correspond to an application that may be configured as part of a CASB profile in a subsequent window. As an example, the application identifiers 408-1, 408-2, 408-3, 408-4, 408-5, and/or 408-N may include an application identifying symbol and/or application identifying text that corresponds to the application. Although the application panel 404 is shown as including at least five application identifiers in a certain spatial arrangement, the application panel may include more than or less than five application identifiers that may be in a similar or different spatial arrangement.

The application panel 404 may be used by a user to select an application to be configured as part of a CASB profile in a subsequent window. In an embodiment, the user may navigate (e.g., scroll through) the application panel 404 to find a desired application. Once the desired application has been found, the user may select the desired application by clicking on the application identifier of the desired application. The application identifiers 408-1, 408-2, 408-3, and 408-4 have been selected by the user (shown by solid lines). When an application has been selected by the user, the corresponding application identifier may indicate that it has been selected via, for example, a change in color (e.g., from gray to green) or other visual selected indication. The application identifiers 408-5 and 408-N have not been selected by the user (shown by dashed lines). When an application has not been selected by the user, the corresponding application identifier may indicate that it has not been selected via, for example, a gray color or other visual unselected indication.

The selected application panel 406 displays the applications selected from the application panel 404 via selected application identifiers 410-1, 410-2, 410-3, and 410-4. In an embodiment, the selected application identifiers 410-1, 410-2, 410-3, and 410-4 include selected application identifying symbols and/or selected application identifying text that indicate the corresponding selected applications. The selected application identifiers 410-1, 410-2, 410-3, and 410-4 are spatially grouped in a linear manner, but may also be spatially grouped in clusters. In some embodiments, the selected application identifiers 410-1, 410-2, 410-3, and 410-4 include a "remove" button (not shown) that, when clicked on by a user, unselects a corresponding selected application. In some embodiments, the selected application panel 406 includes a "remove all" button (not shown) that, when clicked on by the user, unselects all of the selected applications.

Although the preceding CASB configuration window 400 is shown as including certain components (e.g., the application search bar 402, the application panel 404, and the selected application panel 406) in a certain arrangement, the preceding CASB configuration window may also include more or less components in a similar or different arrangement.

Figure 5:
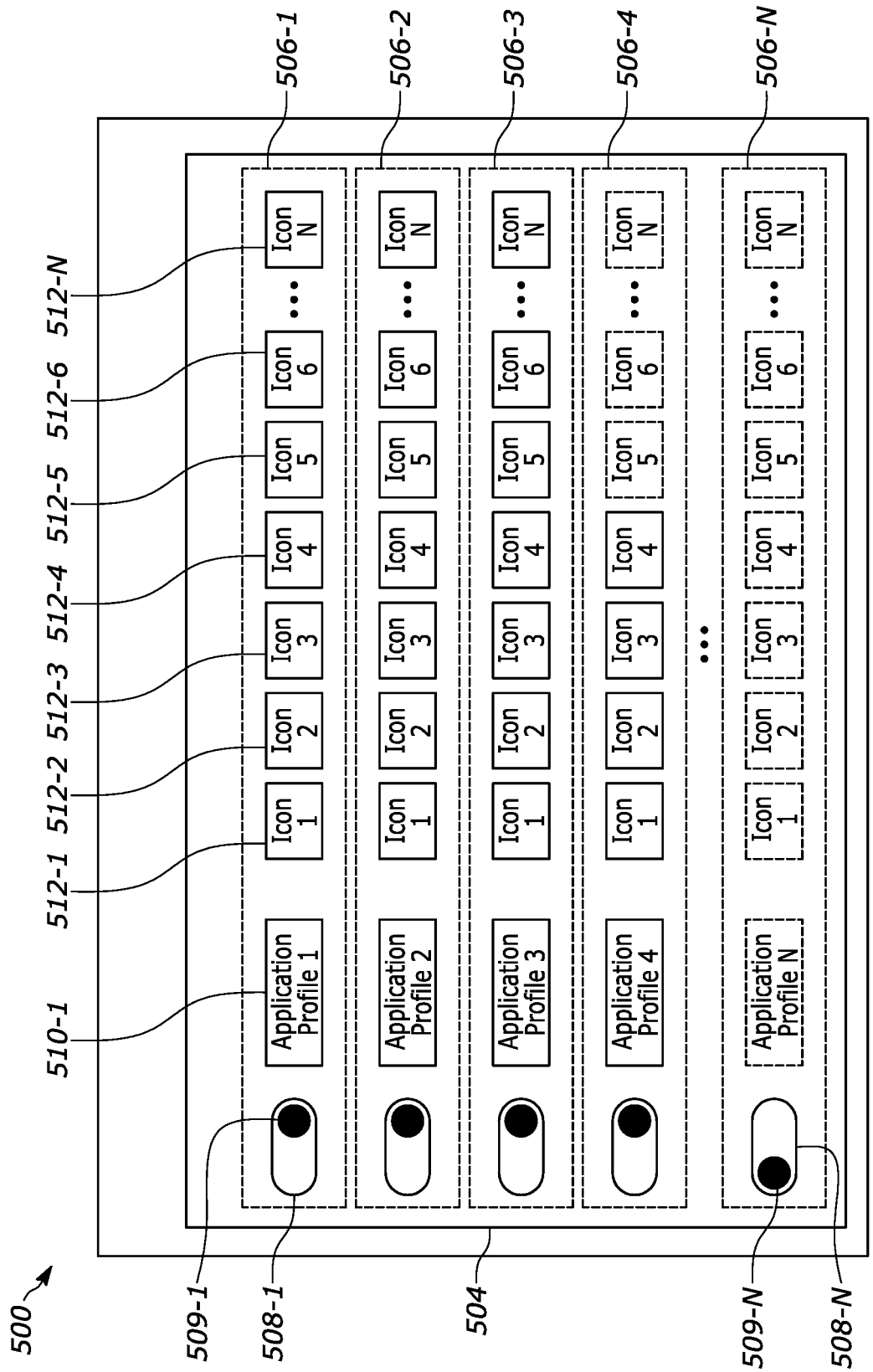
FIG. 5 depicts an example of a CASB configuration window that includes a CASB profile control menu.

FIG. 5 depicts an example of a CASB configuration window 500 that includes a CASB profile control menu 504. In some embodiments, the CASB configuration window 500 represents the CASB configuration window 304 and is displayed via a GUI that is displayed on the display 302 of the client device 300. As an example, the CASB configuration window 500 is displayed as part of an application or a browser that is run (e.g., processed) by the client device. Various elements of the CASB configuration window 500 may be controlled by a user to configure a CASB profile that is enforced during CASB protected activity. In some embodiments, a user may navigate to the CASB configuration window 500 after selecting applications from the preceding CASB configuration window 400 (FIG. 4).

The CASB profile control menu 504 is displayed within the CASB configuration window 500. In an embodiment, the CASB profile control menu 504 includes a plurality of spatially grouped sets 506-1, 506-2, 506-3, 506-4, and 506-N that are displayed in a series of rows. In an embodiment, spatially grouped set 506-N represents a fifth or greater spatially grouped set. In some embodiments, the number of spatially grouped sets may be determined by the number of applications selected in a preceding CASB configuration window 400 (FIG. 4), such that there may be a spatially grouped set for each selected application. In some embodiments, the CASB profile control menu is outlined by a frame or a border that surrounds the plurality of spatially group sets. Although not shown, there may also be fewer than five spatially grouped sets. In addition, the plurality of spatially grouped sets 506-1, 506-2, 506-3, 506-4, and 506-N may be displayed in a series of columns, in a series of clusters, or other similar spatial arrangement. An embodiment where the plurality of spatially grouped sets are displayed in a series of clusters is described in further detail with reference to FIG. 7.

Each spatially grouped set includes a group of elements or features (e.g., an application access controller, an application identifier, and selectable CASB activity action icons) that are displayed around or near each other in a similar area. In some embodiments, each spatially grouped set is outlined by a frame or a border that surrounds and visually associates the group of elements or features included in the spatially grouped set. Features, aspects, and/or reference numbers of the application access controller, the application identifier, and the selectable CASB activity action icons are described herein with reference to spatially grouped set 506-1 but may be similarly applied to spatially grouped sets 506-2, 506-3, 506-4, and 506-N. Some reference numbers for the application access controller, the application identifier, and the selectable CASB activity action icons of spatially grouped sets 506-2, 506-3, 506-4, and 506-N are not included in FIG. 5 for clarity purposes.

Spatially grouped set 506-1 includes an application access controller 508-1, an application identifier 510-1, and at least six selectable CASB activity action icons 512-1, 512-2, 512-3, 512-4, 512-5, 512-6, and 512-N. In an embodiment, the application access controller, the application identifier, and the selectable CASB activity action icons included in spatially grouped set 506-1 are displayed linearly and correspond to an application profile (e.g., Application Profile 1).

The application access controller 508-1 is a togglable button that may be controlled (e.g., clicked on) by a user of a client device to switch the application access between an "allow" state and a "blocked" state. As such, the application access controller 508-1 controls and indicates whether the application profile (e.g., Application Profile 1) of spatially grouped set 506-1 is allowed or blocked, and controls which selectable CASB activity action icons may be interacted with by a user. In some embodiments, the application profile can be allowed or blocked for all users or for certain groups of users of the corresponding application. In some embodiments, switching the state of the application access controller 508-1 involves clicking on either side of the application access controller, sliding an allow/block indicator 509-1 from side to side within the application access controller, or performing a similar action to move the allow/block indicator 509-1.

The application access controller 508-1 is set to the "allow" state, such that the allow/block indicator 509-1 is on a right side of the application access controller. When the application access controller 508-1 is set to the "allow" state, application access is allowed, an application profile may be configured, and the user is able to interact with (e.g., click on) the selectable CASB activity action icons of the spatially grouped set 506-1. For example, when the application access controller 508-1 is set to the "allow" state, the selectable CASB activity action icons 512-1, 512-2, 512-3, 512-4, 512-5, 512-6, and 512-N that correspond to Application Profile 1 can be selected or unselected as part of the corresponding application profile.

Alternatively, application access controller 508-N of spatially grouped set 506-N is set to the "blocked" state, such that allow/block indicator 509-N is on a left side of the application access controller. When the application access controller is set to the "blocked" state, application access is blocked, an application profile may not be configured, and the user is not able to interact with (e.g., click on) the selectable CASB activity action icons of the spatially grouped set 506-N. For example, when the application access controller 508-N is set to the "blocked" state, the selectable CASB activity action icons that correspond to Application Profile N cannot be selected or unselected as part of the corresponding application profile. In an embodiment, when the application access controller 508-N is set to the "blocked" state, the application profile identifier and the selectable CASB activity action icons of the spatially grouped set 506-N may be blocked and/or grayed out (shown by dashed lines).

The application access controller 508-1 is displayed linearly with the application identifier and the selectable CASB activity action icons of spatially grouped set 506-1. The application access controller 508-1 is also displayed as being adjacent to the application identifier 510-1 on one side, and adjacent to an edge of the CASB profile control menu 504 on another side. Although not shown, the application access controller 508-1 may also be displayed between the application identifier and the selectable CASB activity action icons, between selectable CASB activity action icon 512-N and the CASB profile control menu 504, or somewhere else near the other elements included in spatially grouped set 506-1.

The application access controller 508-1 and/or the allow/block indicator 509-1 may be transparent, translucent, and/or opaque. In some embodiments, the application access controller 508-1 and the allow/block indicator 509-1 may be different colors so that a user is able to identify which side of the application access controller the allow/block indicator is on. As an example, the application access controller 508-1 is blue or green and the allow/block indicator 509-1 is white.

Although the application access controller 508-1 and the allow/block indicator 509-1 are displayed as circular shapes, the application access controller and/or the allow/block indicator may also be displayed as rectangular shapes or as another shape. The application access controller 508-1 may also be represented by an activation button (or other similar switch) that switches between an "allow" state and a "blocked" state. Additionally, the allow/block indicator 509-1 may include an indicator symbol (e.g., a check mark, a shield, an "X", etc.) within the allow/block indicator.

The application identifier 510-1 indicates a corresponding application profile (e.g., Application Profile 1) of spatially grouped set 506-1. Although included in spatially grouped set 506-N, "Application Profile N" represents a fifth or greater CASB profile included in the CASB profile control menu 504. In some embodiments, the application identifier 510-1 is outlined by a frame or a border that surrounds the application identifier. The application identifier 510-1 may include an application identifying symbol and/or application identifying text that corresponds to an application of the application profile. Examples of the corresponding applications indicated by the application identifier include AOL, ADOBE ONLINE OFFICE, AUTODESK, etc.

The application identifier 510-1 is displayed linearly with the application access controller and the selectable CASB activity action icons of spatially grouped set 506-1. The application identifier 510-1 is also displayed as being adjacent to the application access controller 508-1 on one side, and adjacent to selectable CASB activity action icon 512-1 on another side. Although not shown, the application identifier 510-1 may also be displayed between the CASB profile control menu 504 and the application access controller 508-1, between selectable CASB activity action icon 512-N and the CASB profile control menu 504, or somewhere else near the other elements included in spatially grouped set 506-1.

The selectable CASB activity action icons 512-1, 512-2, 512-3, 512-4, 512-5, 512-6, and 512-N correspond to Icon 1, Icon 2, Icon 3, Icon 4, Icon 5, Icon 6, and Icon N, respectively. In an embodiment, selectable CASB activity action 512-N represents a seventh or greater selectable CASB activity action icon included in spatially grouped set 506-1. Although not shown, there may also be fewer than seven selectable CASB activity action icons.

The selectable CASB activity action icons 512-1, 512-2, 512-3, 512-4, 512-5, 512-6, and 512-N are selectable icons that indicate whether a corresponding CASB activity action is selected or unselected. As described herein, CASB activity action icons that are "included" in an application profile of a CASB profile may be "selected" or "activated", such that the selected CASB activity action icons of the application profile correspond to CASB activity actions that are included in the CASB profile and that may be enforced during CASB protected activities. In an embodiment, the selectable CASB activity action icons are a combination of presented icons that are specific to a corresponding application profile (e.g., Application Profile 1). By having the selectable CASB activity action icons specific to the corresponding application profile, a user does not need to determine which CASB activity actions or icons correspond to which application profile. The selectable CASB activity action icons may be automatically provided (e.g., auto-populated) to the user to further improve convenience for the user.

The selectable CASB activity action icons 512-1, 512-2, 512-3, 512-4, 512-5, 512-6, and 512-N can be selected (e.g., clicked on) by a user of a client device to select certain CASB activity actions to be included in an application profile (e.g., Application Profile 1) of a CASB profile. In some embodiments, the selectable CASB activity action icons can (only) become selected if the application access controller 508-1 is set to an "allow" state. In some embodiments, if the application access controller 508-1 is set to a "blocked" state, then a user may not be able to interact with (e.g., click on and/or select) the selectable CASB activity action icons.

The selectable CASB activity action icons 512-1, 512-2, 512-3, 512-4, 512-5, 512-6, and 512-N that are selected are included in the application profile (e.g., Application Profile 1) of the CASB profile, and the selectable CASB activity action icons that are unselected may not be included and/or may be blocked in the application profile of the CASB profile. Examples of unselected CASB activity action icons include Icon 5, Icon 6, and Icon N of spatially grouped set 506-4. In an embodiment, the selectable CASB activity action icons that are selected are indicated by a selected color (e.g., green, blue, white, etc.). In another embodiment, the selectable CASB activity action icons that are unselected are indicated by an unselected color (e.g., gray, red, orange, etc.). The selectable CASB activity action icons that are unselected are depicted in FIG. 5 by dashed lines.

The selectable CASB activity action icons 512-1, 512-2, 512-3, 512-4, 512-5, 512-6, and 512-N are displayed as being a square shape, but may also be a rectangular shape, circular shape, or the like. In some embodiments, the selectable CASB activity action icons may be outlined by a frame or a border that surrounds the symbol, the label, and/or the selection indicator. The selectable CASB activity action icons are displayed linearly with the application access controller 508-1 and the application identifier 510-1. The selectable CASB activity action icons are also displayed as being adjacent to the application identifier 510-1 on one side, and adjacent to an edge of the CASB profile control menu 504 on another side.

Although not shown, the selectable CASB activity action icons may also be displayed between the application access controller and the application identifier, between the CASB profile control menu 504 and the application access controller, or somewhere else near the other elements included in spatially grouped set 506-1. Examples of the selectable CASB activity action icons 512-1, 512-2, 512-3, 512-4, 512-5, 512-6, and 512-N are described in further detail with reference to FIG. 8 and FIGS. 9A-9H.

Figure 6:
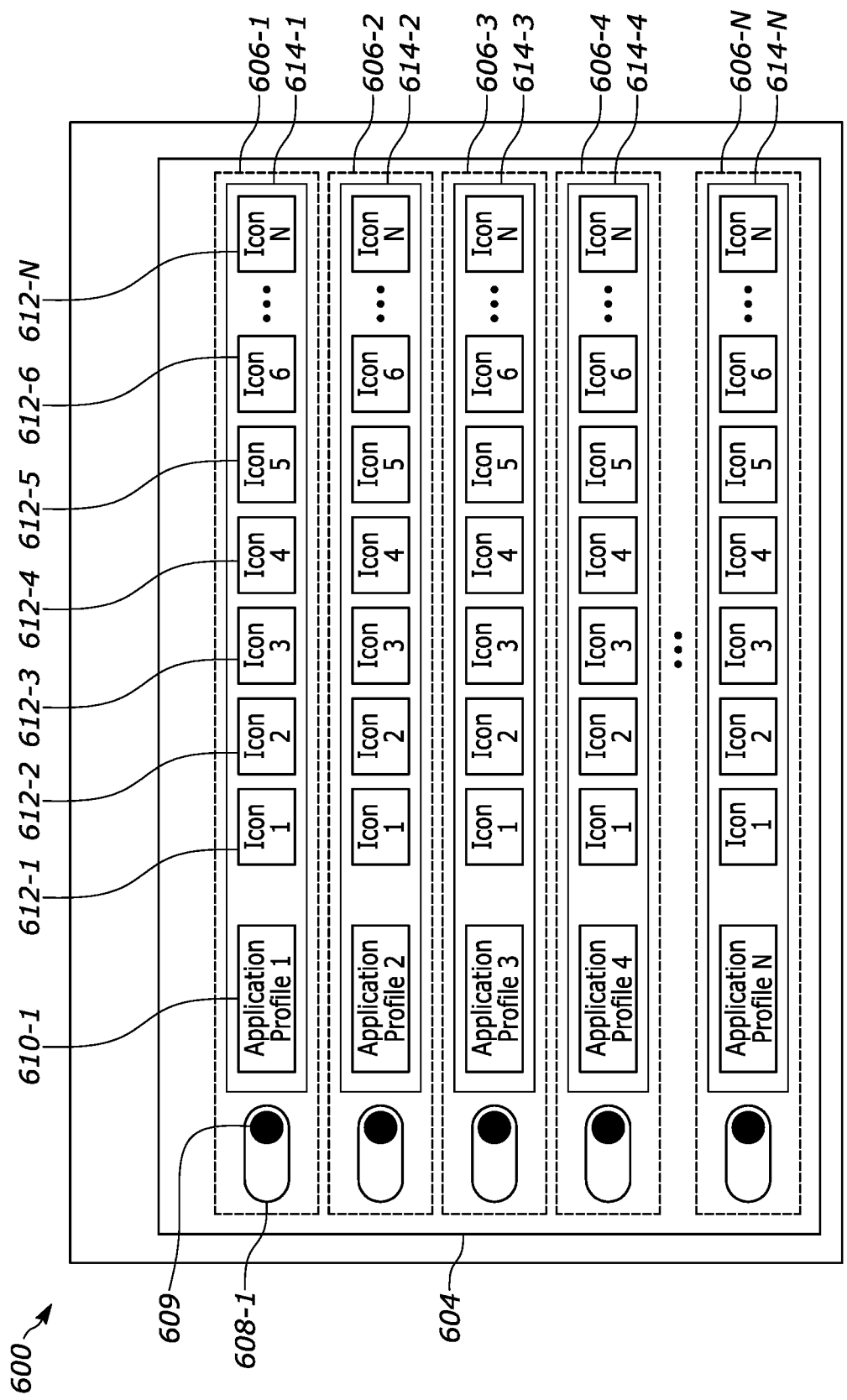
FIG. 6 depicts another example of a CASB configuration window that includes a CASB profile control menu.

FIG. 6 depicts another example of a CASB configuration window 600 that includes a CASB profile control menu 604. The CASB profile control menu 604 includes a plurality of spatially grouped sets 606-1, 606-2, 606-3, 606-4, and 606-N that include application access controllers (e.g., application access controller 608-1), allow/block indicators (e.g., allow/block indicator 609), application identifiers (e.g., application identifier 610-1), and selectable CASB activity action icons (e.g., selectable CASB activity action icons 612-1, 612-2, 612-3, 612-4, 612-5, 612-6, and 612-N) as previously described with reference to FIG. 5.

In contrast to FIG. 5, the spatially grouped sets 606-1, 606-2, 606-3, 606-4, and 606-N shown in FIG. 6 include corresponding application profile panels, implemented as application profile panels 614-1, 614-2, 614-3, 614-4, and 614-N. In an embodiment, application profile panel 614-N represents a fifth or greater application profile panel. The application identifier and the selectable CASB activity action icons of corresponding application profiles are displayed linearly within the application profile panels. For example, application profile panel 614-1 includes the application identifier 610-1 and the selectable CASB activity action icons 612-1, 612-2, 612-3, 612-4, 612-5, 612-6, and 612-N. In an embodiment, the application access controllers of the corresponding application profiles are adjacent to the application profile panels. Although five application profile panels are shown in FIG. 6, there may also be less than five application profile panels. In addition, the shape of the application profile panels may be changed according to the shape of the plurality of spatially grouped sets, or according to the spatial arrangement of the application identifier and the selectable CASB activity action icons.

Figure 7:
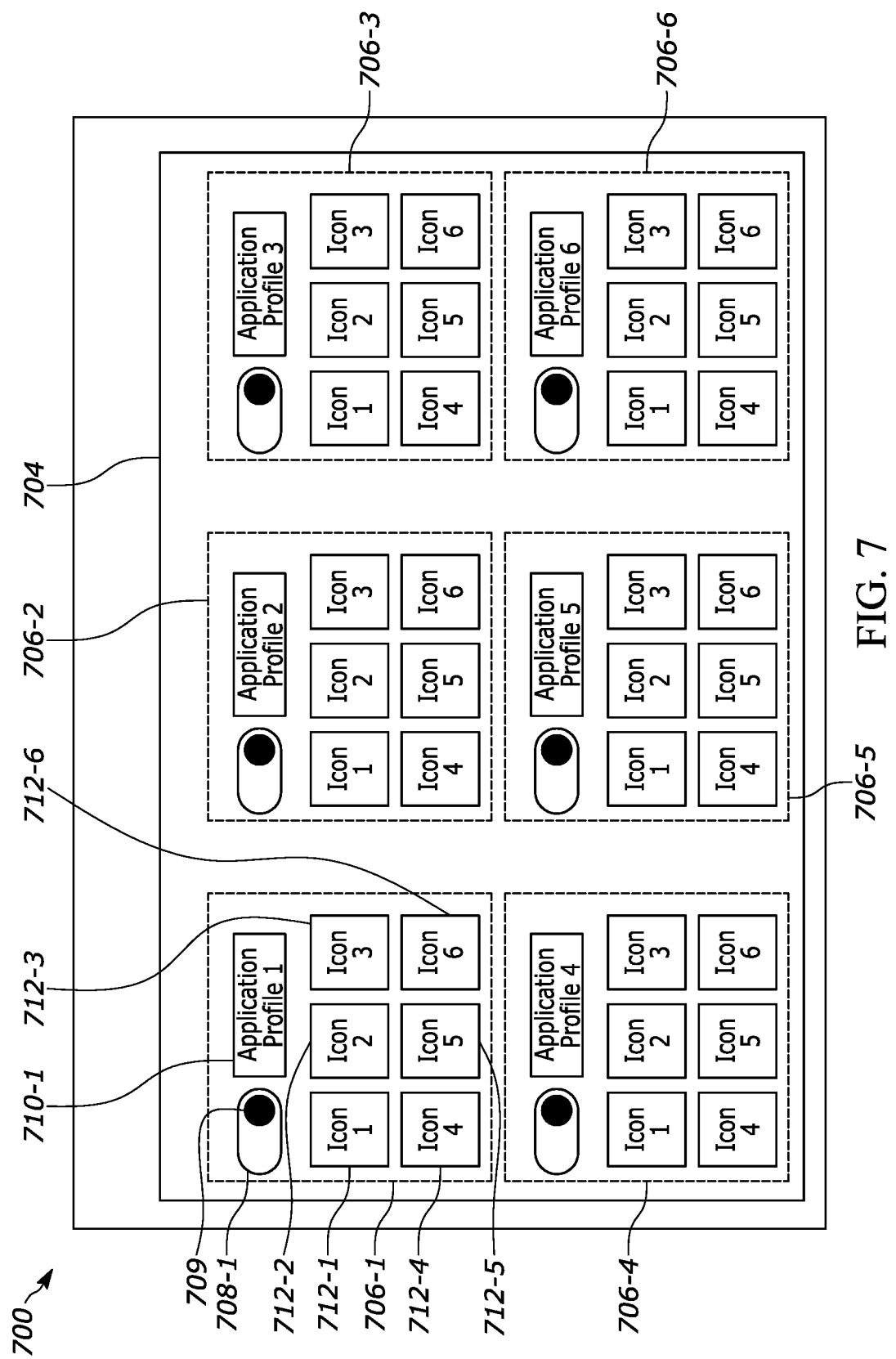
FIG. 7 depicts another example of a CASB configuration window that includes a CASB profile control menu.

FIG. 7 depicts another example of a CASB configuration window 700 that includes a CASB profile control menu 704. The CASB profile control menu 704 includes a plurality of spatially grouped sets 706-1, 706-2, 706-3, 706-4, 706-5, and 706-6 that include application access controllers (e.g., application access controller 708-1), allow/block indicators (e.g., allow/block indicator 709), application identifiers (e.g., application identifier 710-1), and selectable CASB activity action icons (e.g., selectable CASB activity action icons 712-1, 712-2, 712-3, 712-4, 712-5, 712-6) as previously described with reference to FIG. 5.

In contrast to FIG. 5, there are six spatially grouped sets 706-1, 706-2, 706-3, 706-4, 706-5, and 706-6 that are displayed in a series of clusters (e.g., rectangular clusters). In addition, for each spatially grouped set, the application access controller (e.g., application access controller 708-1) is displayed in an upper left portion of the spatially grouped set (e.g., spatially grouped set 706-1) and the application identifier (e.g., application identifier 710-1) is displayed in an upper center portion of the spatially grouped set. Each spatially grouped set also includes six selectable CASB activity action icons that are displayed in a series of rows (e.g., two rows) and in a series of columns (e.g., three columns).

Examples of selectable CASB activity action icons are described in further detail with reference to FIG. 8 and FIGS. 9A-9G.

Figure 8:
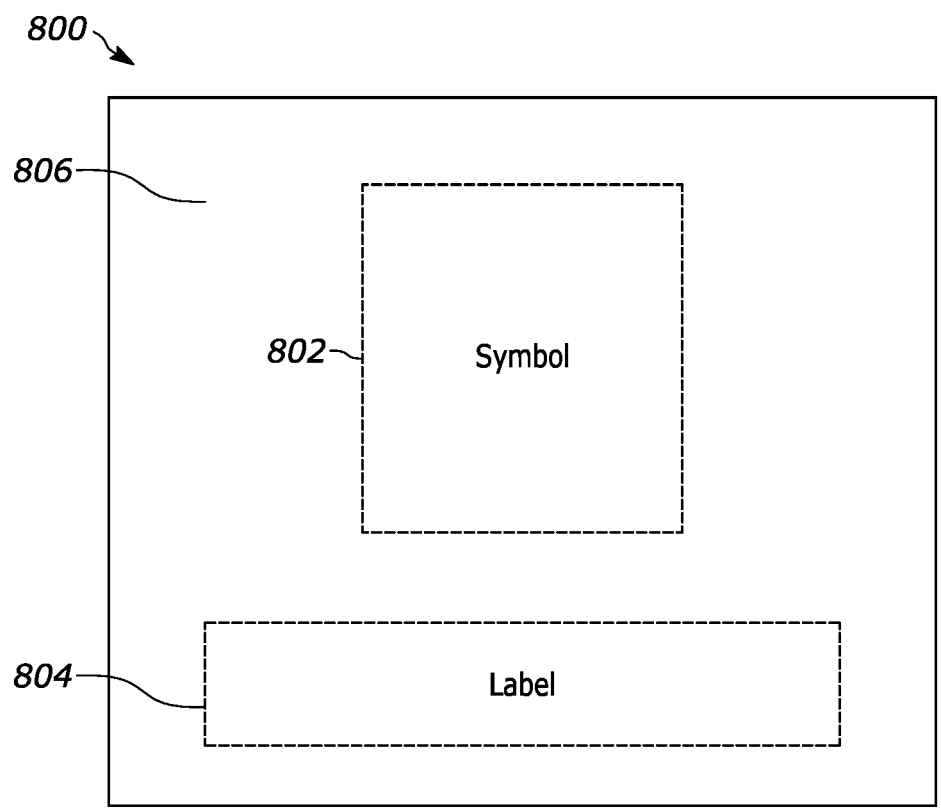
FIG. 8 depicts an outline of a selectable CASB activity action icon that includes a symbol, a label, and a selection indicator.

FIG. 8 depicts an outline of a selectable CASB activity action icon 800 that includes a symbol 802, a label 804, and a selection indicator 806. In an embodiment, the selectable CASB activity action icon 800 represents the selectable CASB activity action icons shown in FIGS. 5-7. The selectable CASB activity action icon 800 corresponds to a CASB activity action (e.g., search, edit, create, share, login, download attachment, upload file, delete, etc.) that may be included in a CASB profile as part of a CASB profile. As such, the selectable CASB activity action icon 800 includes the symbol 802, the label 804, and the selection indicator 806 to indicate whether the corresponding CASB activity action is included (e.g., "selected") as part of the CASB profile.

The symbol 802 is displayed in a center portion of the selectable CASB activity action icon 800 above the label 804. As an example, the symbol is a magnifying glass symbol, a page with a pencil symbol, a circle with a cross symbol, a three connected circles symbol, an arrow symbol, a page with an arrow symbol, a trash can symbol, or other symbol that indicates the corresponding CASB activity action. In such an example, the corresponding CASB activity actions are search for the magnifying glass symbol, edit for the page with a pencil symbol, create for the circle with a cross symbol, share for the three connected circles symbol, login for the arrow symbol, download attachment or upload attachment for the page with an arrow symbol, and delete for the trash can symbol.

The label 804 is displayed in a lower center portion of the selectable CASB activity action icon 800 below the symbol 802 and the selection indicator 806. In an embodiment, the label 804 indicates a CASB activity action. As an example, the label is "search", "edit", "create", "share", "login", "download attachment", "upload attachment", "delete", or other label that indicates the corresponding CASB activity action.

The selection indicator 806 is a color of the selectable CASB activity action icon 800. In one embodiment, the selection indicator 806 is green selected color that indicates that the selectable CASB activity action icon 800 is selected and included as part of a CASB profile. In another embodiment, the selection indicator 806 is a gray unselected color that indicates that selectable CASB activity action icon 800 is unselected and either blocked or not included as part of the CASB profile.

Although not shown, in some embodiments, the selection indicator may be another type of indicator. For example, the selection indicator may be a checkmark in a semicircle, a line through a circle, or selection indicating text. In such an example, the checkmark in the semicircle indicates that the corresponding CASB activity action is included (e.g., "selected") as part of the CASB profile, the line through the circle indicates that the corresponding CASB activity action is not included (e.g., "unselected") as part of the CASB profile, and the selection indicating text indicates that the corresponding CASB activity action may or may not be included as part of the CASB profile.

Although the selectable CASB activity action icon 800 is shown as having certain elements (e.g., symbol 802, label 804, and selection indicator 806) in a certain arrangement, the selectable CASB activity action icon is not limited to the elements and/or the arrangement shown in FIG. 8. For example, the symbol 802, the label 804, and/or the selection indicator 806 may or may not be included in the selectable CASB activity action icon or may be in different areas of the selectable CASB activity action icon.

Figure 9A:
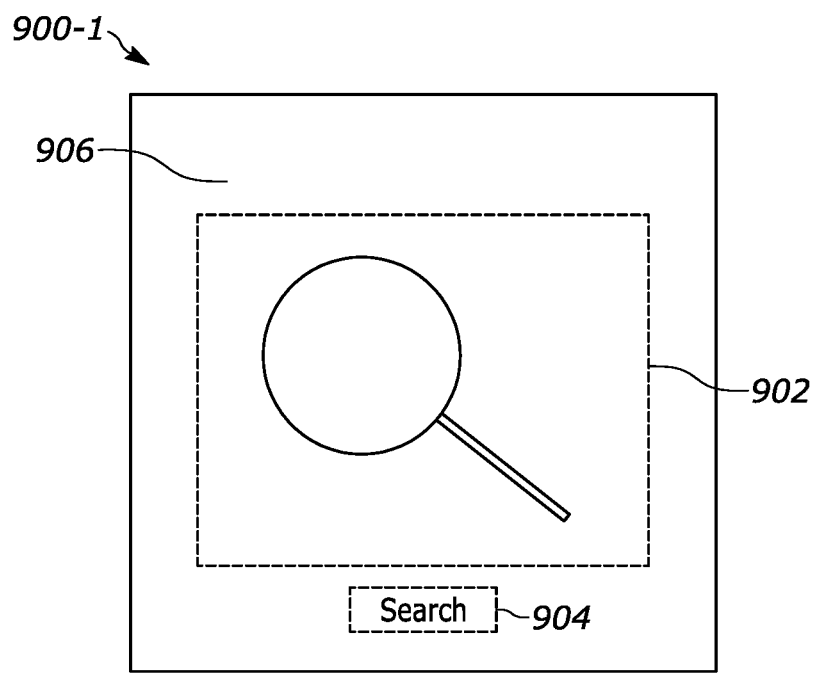
FIG. 9A depicts an example of a selectable CASB activity action icon that corresponds to search.

FIG. 9A depicts an example of a selectable CASB activity action icon 900-1 that corresponds to search. The selectable CASB activity action icon 900-1 includes a symbol 902, a label 904, and a selection indicator 906 as previously described with reference to FIG. 8. In an embodiment, the symbol 902 is a magnifying glass symbol and the label 904 is "search".

In an embodiment, when the selectable CASB activity action icon 900-1 is included as part of an application profile in a CASB profile, a user may or may not have access to a search function when using an application corresponding to the application profile. For example, the user is able to use the search function of the application corresponding the application profile when the search function is allowed, but is not able to use the search function when the search function is blocked.

Figure 9B:
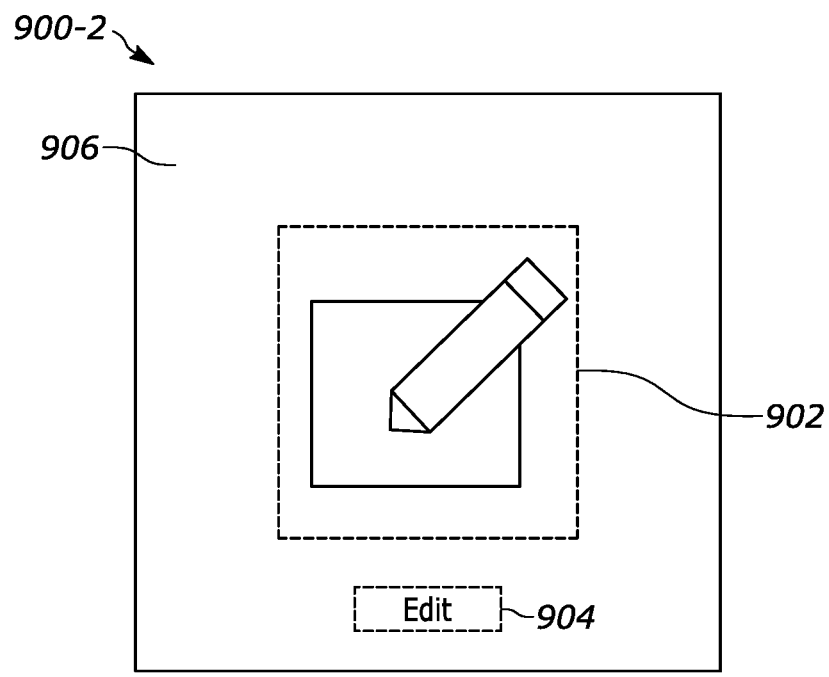
FIG. 9B depicts an example of a selectable CASB activity action icon that corresponds to edit.

FIG. 9B depicts an example of a selectable CASB activity action icon 900-2 that corresponds to edit. The selectable CASB activity action icon 900-2 includes a symbol 902, a label 904, and a selection indicator 906 as previously described with reference to FIG. 8. In an embodiment, the symbol 902 is a page with a pencil symbol and the label 904 is "edit".

In an embodiment, when the selectable CASB activity action icon 900-2 is included as part of an application profile in a CASB profile, a user may or may not have access to an edit function when using an application corresponding to the application profile. For example, the user is able to use the edit function of the application corresponding the application profile when the edit function is allowed, but is not able to use the edit function when the edit function is blocked.

Figure 9C:
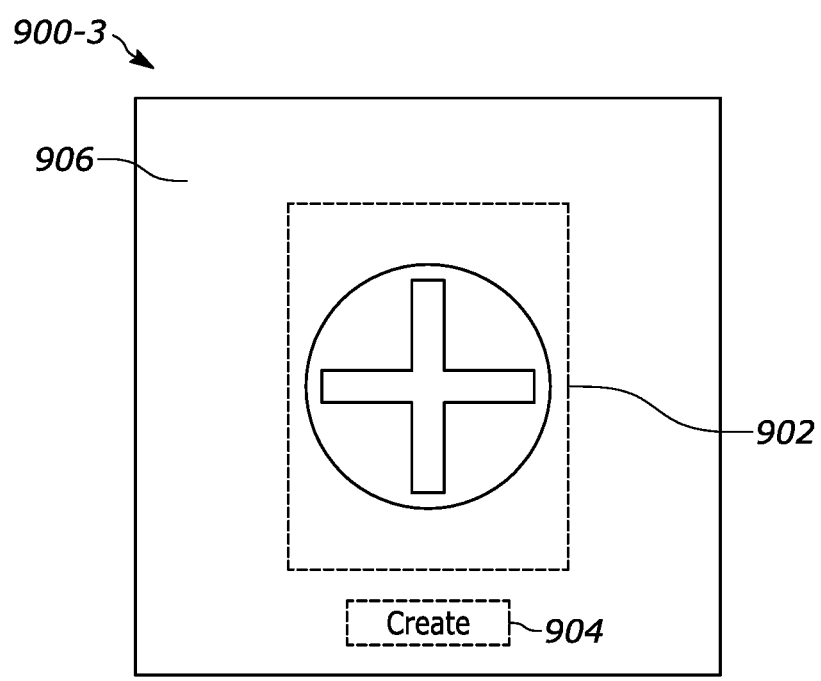
FIG. 9C depicts an example of a selectable CASB activity action icon that corresponds to create.

FIG. 9C depicts an example of a selectable CASB activity action icon 900-3 that corresponds to create. The selectable CASB activity action icon 900-3 includes a symbol 902, a label 904, and a selection indicator 906 as previously described with reference to FIG. 8. In an embodiment, the symbol 902 is a circle with a cross symbol and the label 904 is "create".

In an embodiment, when the selectable CASB activity action icon 900-3 is included as part of an application profile in a CASB profile, a user may or may not have access to a create function when using an application corresponding to the application profile. For example, the user is able to use the create function of the application corresponding the application profile when the create function is allowed, but is not able to use the create function when the create function is blocked.

Figure 9D:
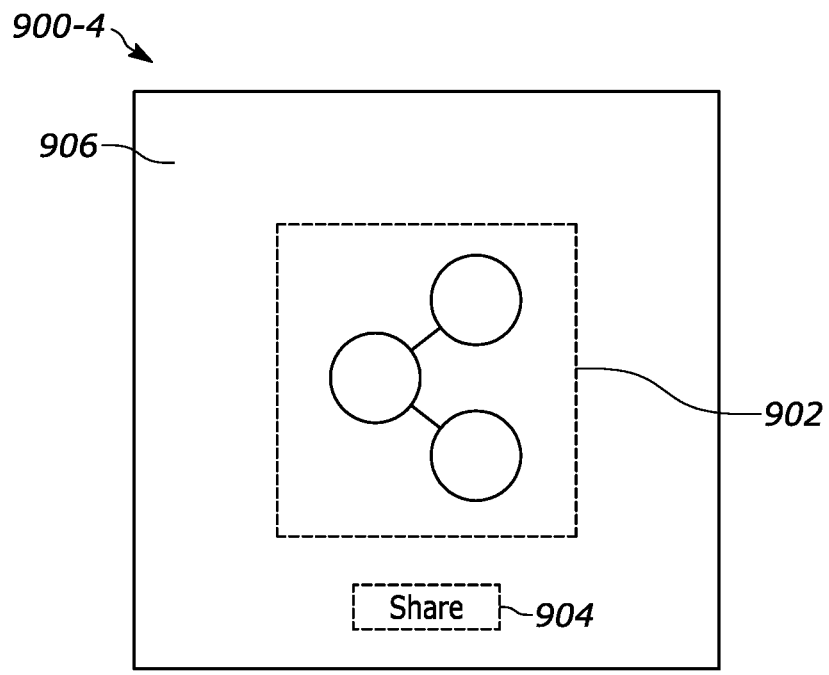
FIG. 9D depicts an example of a selectable CASB activity action icon that corresponds to share.

FIG. 9D depicts an example of a selectable CASB activity action icon 900-4 that corresponds to share. The selectable CASB activity action icon 900-4 includes a symbol 902, a label 904, and a selection indicator 906 as previously described with reference to FIG. 8. In an embodiment, the symbol 902 is a three connected circles symbol and the label 904 is "share".

In an embodiment, when the selectable CASB activity action icon 900-4 is included as part of an application profile in a CASB profile, a user may or may not have access to a share function when using an application corresponding to the application profile. For example, the user is able to use the share function of the application corresponding the application profile when the share function is allowed, but is not able to use the share function when the share function is blocked.

Figure 9E:
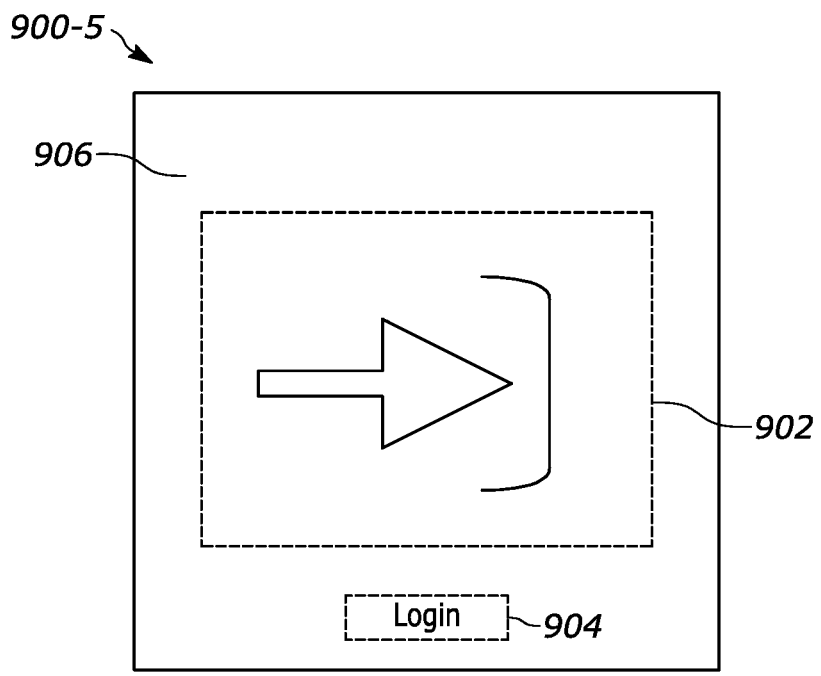
FIG. 9E depicts an example of a selectable CASB activity action icon that corresponds to login.

FIG. 9E depicts an example of a selectable CASB activity action icon 900-5 that corresponds to login. The selectable CASB activity action icon 900-5 includes a symbol 902, a label 904, and a selection indicator 906 as previously described with reference to FIG. 8. In an embodiment, the symbol 902 is an arrow symbol and the label 904 is "login".

In an embodiment, when the selectable CASB activity action icon 900-5 is included as part of an application profile in a CASB profile, a user may or may not have access to a login function when using an application corresponding to the application profile. For example, the user is able to use the login function of the application corresponding the application profile when the login function is allowed, but is not able to use the login function when the login function is blocked.

Figure 9F:
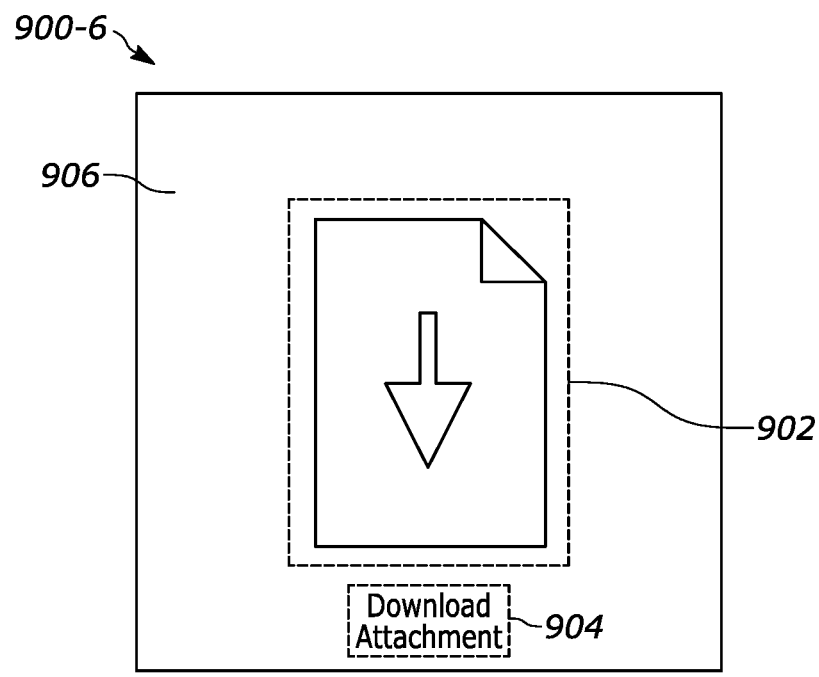
FIG. 9F depicts an example of a selectable CASB activity action icon that corresponds to download attachment.

FIG. 9F depicts an example of a selectable CASB activity action icon 900-6 that corresponds to download attachment. The selectable CASB activity action icon 900-6 includes a symbol 902, a label 904, and a selection indicator 906 as previously described with reference to FIG. 8. In an embodiment, the symbol 902 is a cookie with a page with an arrow symbol and the label 904 is "download attachment".

In an embodiment, when the selectable CASB activity action icon 900-6 is included as part of an application profile in a CASB profile, a user may or may not have access to a download attachment function when using an application corresponding to the application profile. For example, the user is able to use the download attachment function of the application corresponding the application profile when the download attachment function is allowed, but is not able to use the download attachment function when the download attachment function is blocked.

Figure 9G:
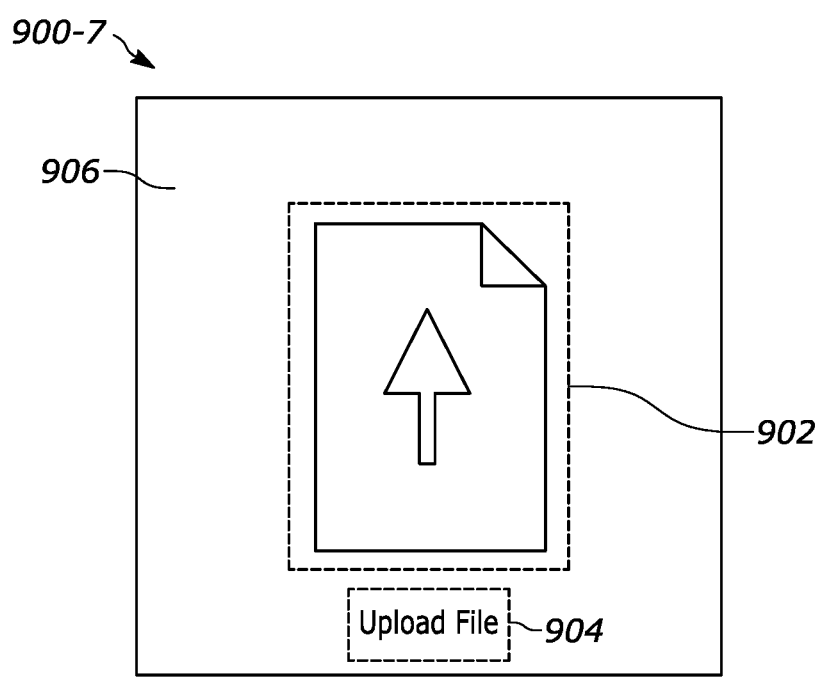
FIG. 9G depicts an example of a selectable CASB activity action icon that corresponds to upload file.
Figure 9H:
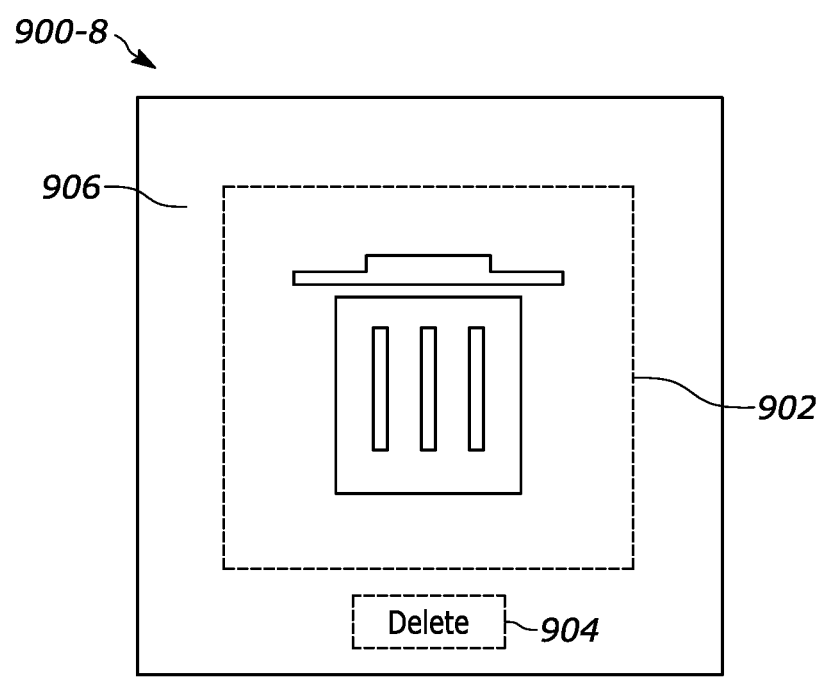
FIG. 9H depicts an example of a selectable CASB activity action icon that corresponds to delete.

FIG. 9G depicts an example of a selectable CASB activity action icon 900-7 that corresponds to upload file. The selectable CASB activity action icon 900-7 includes a symbol 902, a label 904, and a selection indicator 906 as previously described with reference to FIG. 8. In an embodiment, the symbol 902 is a page with an arrow symbol and the label 904 is "upload file".

In an embodiment, when the selectable CASB activity action icon 900-7 is included as part of an application profile in a CASB profile, a user may or may not have access to an upload file function when using an application corresponding to the application profile. For example, the user is able to use the upload file function of the application corresponding the application profile when the upload file function is allowed, but is not able to use the upload file function when the upload file function is blocked.

FIG. 9F depicts an example of a selectable CASB activity action icon 900-8 that corresponds to delete. The selectable CASB activity action icon 900-8 includes a symbol 902, a label 904, and a selection indicator 906 as previously described with reference to FIG. 8. In an embodiment, the symbol 902 is a cookie with a trash can symbol and the label 904 is "delete".

In an embodiment, when the selectable CASB activity action icon 900-8 is included as part of an application profile in a CASB profile, a user may or may not have access to a delete function when using an application corresponding to the application profile. For example, the user is able to use the delete function of the application corresponding the application profile when the delete function is allowed, but is not able to use the delete function when the delete function is blocked.

With reference to FIG. 8 and FIGS. 9A-9H, the selectable CASB activity action icons graphically indicate to a user in a single window, a combination of CASB activity actions that will be active for an application profile of a CASB profile. In some embodiments, the selectable CASB activity action icons are a profile specific set of icons for a corresponding application profile. In such an embodiment, the profile specific set may be the same or different for each corresponding application profile of the spatially grouped sets. The symbol, the label, and/or the selection indicator of the selectable CASB activity action icons make it easy for the user to ascertain the combination of CASB activity actions that are activated for the application profile of the CASB profile. For example, the user may be able to visually interpret from the symbols, the labels, and/or the selection indicators the combination of CASB activity actions that are activated in a CASB profile.

Figure 10:
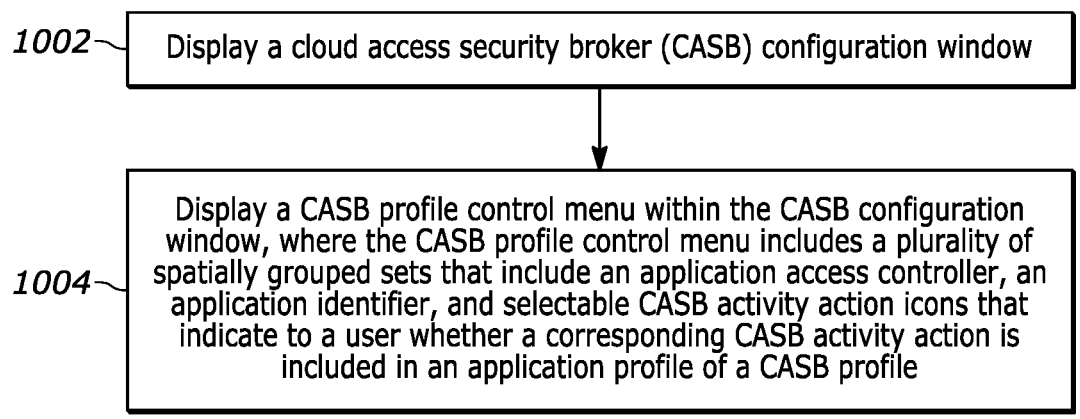
FIG. 10 illustrates a flow diagram of a technique for displaying a CASB configuration window in accordance with an embodiment of the invention.

FIG. 10 illustrates a flow diagram of a technique for displaying a CASB configuration window in accordance with an embodiment of the invention. At block 1002, a CASB configuration window is displayed. At block 1004, a CASB profile control menu is displayed within the CASB configuration window, where the CASB profile control menu includes a plurality of spatially grouped sets that include an application access controller, an application identifier, and selectable CASB activity action icons that indicate to a user whether a corresponding CASB activity action is included in an application profile of a CASB profile.

In some embodiments, the technique for displaying a CASB configuration window is performed by a system. For example, the system includes at least one processor configured to execute computer readable instructions stored in at least memory, where the computer readable instructions when executed by the at least one processor perform a method comprising displaying a CASB configuration window, and displaying a CASB profile control menu within the CASB configuration window, where the CASB profile control menu includes a plurality of spatially grouped sets that include an application access controller, an application identifier, and selectable CASB activity action icons that indicate to a user whether a corresponding CASB activity action is included in an application profile of a CASB profile.

In some embodiments, a technique for displaying a CASB profile involves displaying a CASB configuration window, and displaying a CASB profile control menu within the CASB configuration window, where the CASB profile control menu includes a plurality of spatially grouped sets that include an application access controller, an application identifier, and selectable CASB activity action icons that indicate to a user whether a corresponding CASB activity action is included in an application profile of a CASB profile.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A non-transitory computer readable medium comprising instructions to be executed in a computer system, wherein the instructions when executed in the computer system perform a method comprising:
   displaying a cloud access security broker (CASB) configuration window; and
   displaying a CASB profile control menu within the CASB configuration window, wherein the CASB profile control menu includes a plurality of spatially grouped sets that include an application access controller, an application identifier, and selectable CASB activity action icons that indicate to a user whether a corresponding CASB activity action is included in an application profile of a CASB profile;

wherein:
   the spatially grouped sets that include the application access controller, the application identifier, and the selectable CASB activity action icons correspond to an application profile, wherein the selectable CASB activity action icons are an application specific set of icons for the corresponding application profile; and
   the selectable CASB activity action icons include a symbol, a label, and a selection indicator, wherein the symbol and the label indicate the corresponding CASB activity action and the selection indicator indicates whether the corresponding CASB activity action is included in the application profile.

2. The non-transitory computer readable medium of claim 1, wherein the spatially grouped sets that include the application access controller, the application identifier, and the selectable CASB activity action icons are displayed in a series of rows within the CASB profile control menu.

3. The non-transitory computer readable medium of claim 1, wherein the spatially grouped sets that include the application access controller, the application identifier, and the selectable CASB activity action icons correspond to application profiles.

4. The non-transitory computer readable medium of claim 3, wherein the application identifier and the selectable CASB activity action icons of the corresponding application profiles are displayed linearly within application profile panels.

5. The non-transitory computer readable medium of claim 3, wherein:
   the application identifier and the selectable CASB activity action icons of the corresponding application profiles are displayed linearly within application profile panels; and
   the application access controllers of the corresponding application profiles are adjacent to the application profile panels.

6. The non-transitory computer readable medium of claim 1, wherein the application access controller is displayed by a togglable button that controls access to an application.

7. The non-transitory computer readable medium of claim 1, wherein when one of the application access controllers is set to an "allow" state, the selectable CASB activity action icons that correspond to a same application profile can be selected.

8. The non-transitory computer readable medium of claim 1, wherein when one of the application access controllers is set to a "blocked" state, the selectable CASB activity action icons that correspond to a same application profile cannot be selected.

9. The non-transitory computer readable medium of claim 1, wherein application profiles corresponding to the application access controllers that are set to an "allow" state are allowed in the CASB profile.

10. The non-transitory computer readable medium of claim 1, wherein application profiles corresponding to the application access controllers that are set to a "blocked" state are blocked in the CASB profile.

11. The non-transitory computer readable medium of claim 1, wherein the selectable CASB activity action icons that are selected are included in the application profile of the CASB profile.

12. The non-transitory computer readable medium of claim 1, wherein the selectable CASB activity action icons that are unselected are not included in the application profile of the CASB profile.

13. The non-transitory computer readable medium of claim 1, wherein the selectable CASB activity action icons include a symbol, a label, and a selection indicator.

14. The non-transitory computer readable medium of claim 13, wherein:
the symbol is at least one of a magnifying glass symbol, a page with a pencil symbol, a circle with a cross symbol, a three connected circles symbol, an arrow symbol, a page with an arrow symbol, and a trash can symbol;
the label indicates a CASB activity that is at least one of search, edit, create, share, login, download attachment, upload file, and delete; and
the selection indicator is at least one of a green selected color and a gray unselected color.

15. The non-transitory computer readable medium of claim 14, wherein the selectable CASB activity action icons that are selected are indicated by the green selected color.

16. The non-transitory computer readable medium of claim 14, wherein the selectable CASB activity action icons that are unselected are indicated by the gray unselected color.

17. A system comprising:
at least one processor configured to execute computer readable instructions stored in at least memory, wherein the computer readable instructions when executed by the at least one processor perform a method comprising:
displaying a cloud access security broker (CASB) configuration window; and
displaying a CASB profile control menu within the CASB configuration window, wherein the CASB profile control menu includes a plurality of spatially grouped sets that include an application access controller, an application identifier, and selectable CASB activity action icons that indicate to a user whether a corresponding CASB activity action is included in an application profile of a CASB profile;
wherein:
the spatially grouped sets that include the application access controller, the application identifier, and the selectable CASB activity action icons correspond to an application profile, wherein the selectable CASB activity action icons are an application specific set of icons for the corresponding application profile; and
the selectable CASB activity action icons include a symbol, a label, and a selection indicator, wherein the symbol and the label indicate the corresponding CASB activity action and the selection indicator indicates whether the corresponding CASB activity action is included in the application profile.

18. A non-transitory computer readable medium comprising instructions to be executed in a computer system, wherein the instructions when executed in the computer system perform a method comprising:
displaying a cloud access security broker (CASB) configuration window; and
displaying a CASB profile control menu within the CASB configuration window, wherein the CASB profile control menu includes a plurality of spatially grouped sets that include an application access controller, an application identifier, and selectable CASB activity action icons that indicate to a user whether a corresponding CASB activity action is included in an application profile of a CASB profile;
wherein:
the spatially grouped sets that include the application access controller, the application identifier, and the selectable CASB activity action icons correspond to an application profile and are displayed linearly within the CASB profile control menu; and
the selectable CASB activity action icons include a symbol, a label, and a selection indicator, wherein the symbol and the label indicate the corresponding CASB activity action and the selection indicator indicates whether the corresponding CASB activity action is included in the application profile.

* * * * *